United States Patent [19]

Campen

[11] Patent Number: 4,573,724
[45] Date of Patent: Mar. 4, 1986

[54] HARDBAR ENERGY ABSORBING AND VIBRATION DAMPING BUMPER SYSTEM DAMPING FEATURE

[75] Inventor: Lawrence E. Campen, Anderson, Ind.

[73] Assignee: General Motors Corporation, Detroit, Mich.

[21] Appl. No.: 555,502

[22] Filed: Nov. 28, 1983

[51] Int. Cl.⁴ .................... B60R 19/30; F16F 7/00
[52] U.S. Cl. .................... 293/136; 293/104; 267/140; 188/379
[58] Field of Search ........... 293/104, 110, 120, 132, 293/135, 136; 267/139, 140; 188/379

[56] References Cited

U.S. PATENT DOCUMENTS 1,867,753  7/1932  Paton .................... 293/104
4,022,505  5/1977  Saczawa, Jr. .......... 293/120
4,413,856  11/1983  McMahan et al. ...... 293/120
4,465,312  8/1984  Werner .................. 293/132

*Primary Examiner*—Robert B. Reeves
*Assistant Examiner*—Dennis H. Pedder
*Attorney, Agent, or Firm*—Charles R. White

[57] ABSTRACT

Hardbar bumper assembly is supported by and elastically isolated from the vehicle body by resilient energy absorber so that the bumper functions as a mechanical damper for damping internal vibrations occurring within the vehicle during engine operation including idle. The energy absorber effectively dissipates energy of impact loads including frontal corner and side impacts displacing the bumper from a normal operating position.

5 Claims, 9 Drawing Figures

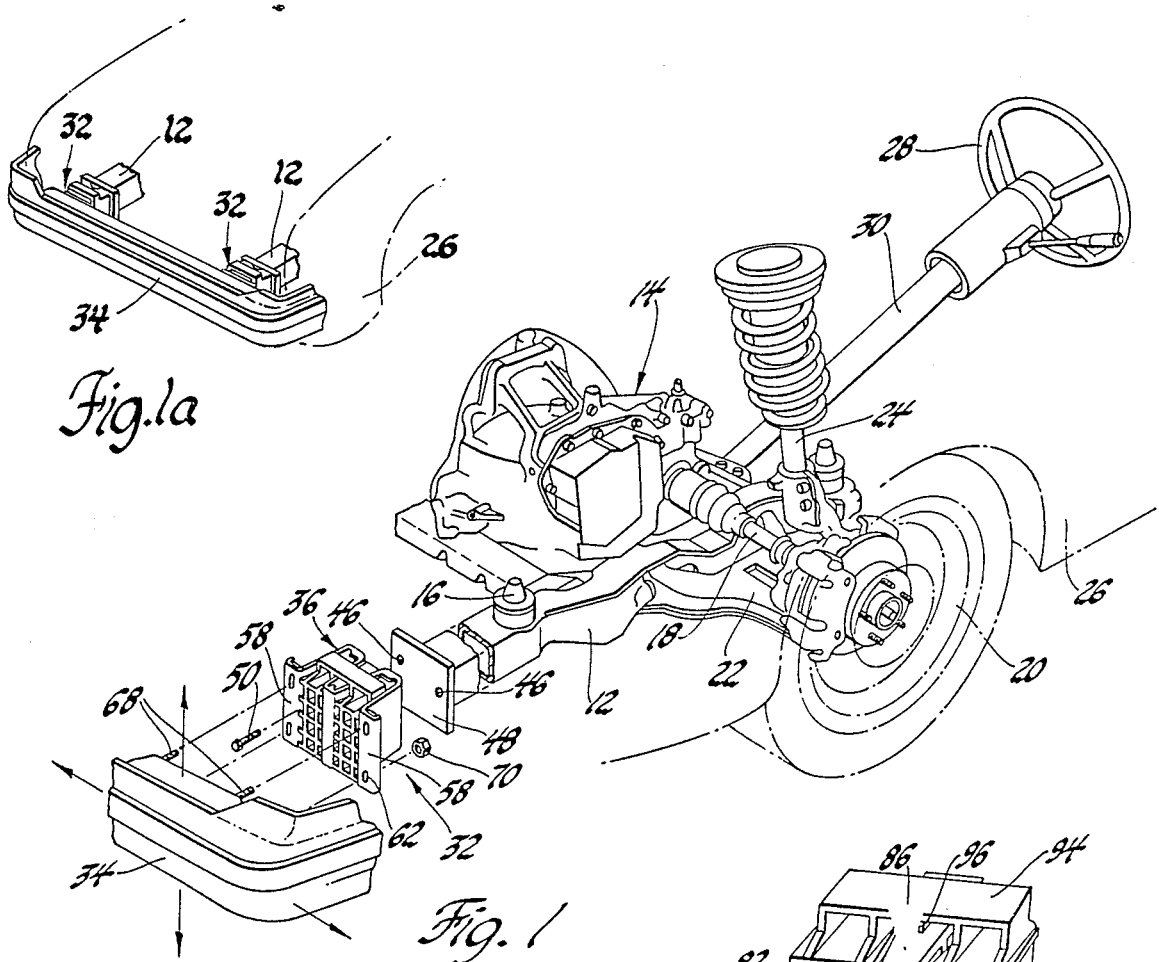
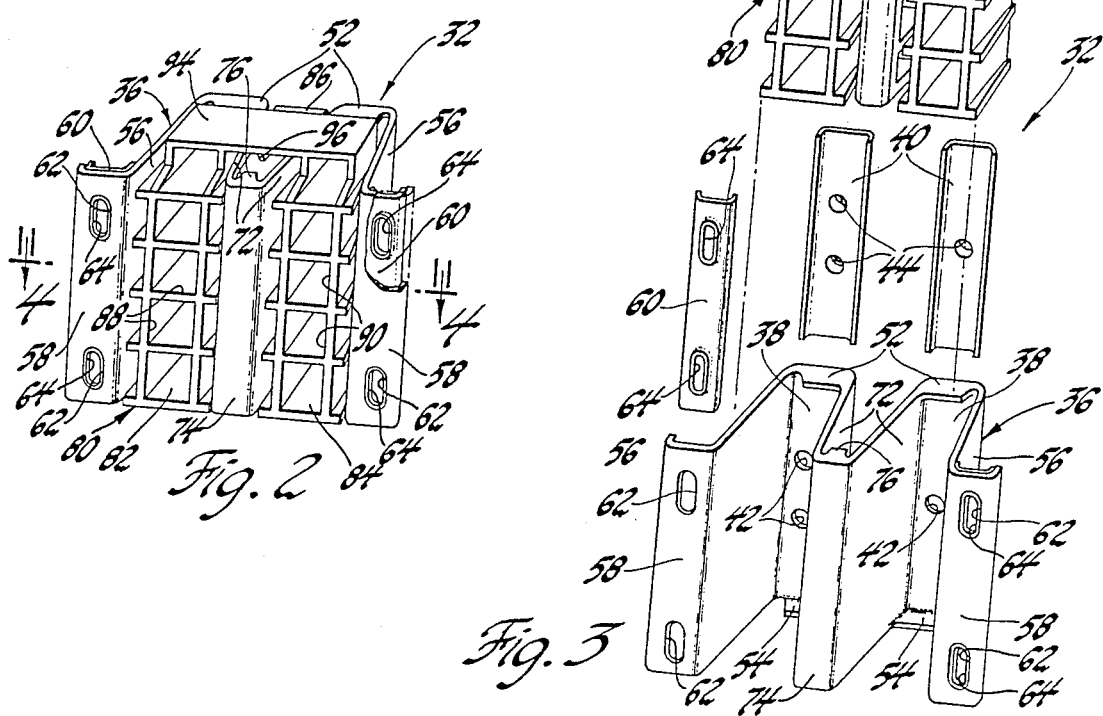

HARDBAR ENERGY ABSORBING AND VIBRATION DAMPING BUMPER SYSTEM DAMPING FEATURE

This invention relates to vehicle bumpers and more particularly to a new and improved energy absorbing and vibration damping hardbar bumper and bumper mount assembly which absorbs impact energy stroking the bumper and which dissipates vibratory energy intermittently occurring in the vehicle steering column and other vehicular components.

In U.S. Pat. No. 4,413,856, issued Nov. 8, 1983 to McMahan et al filed Aug. 7, 1981 for Hardbar Energy Absorbing Bumper System For Vehicles and assigned to the assignee of this invention a rigid hardbar bumper is mounted to the vehicle frame by a specialized bracket which houses cellular energy absorbing media which deflects impact load applied to the vehicle bumper and dissipates impact energy. The bracket and the media recover to their preimpact position for repositioning the bumper subsequent to the impact.

The present invention is of this general category but is further improved by the provision of rotation of the center cell section 90° to provide more lateral rigidity and a more uniform load over the entire deflection stroke. With this section rotated 90°, the center cells provide more efficient load absorption and load is spread over a larger area. With this invention cell depth can be substantially reduced, from four to two inches for example. This reduces the amount of material required, the molding cycle time and makes the part easier to mold. The present invention further provides for a new and improved interconnection between the three major components or sections of the cellular energy absorbers so that they can be molded as a unit with the cells in the same axial direction to facilitate molding. When removed from the mold, the center section can be turned on live hinge means 90° so that the cells of the center section have a direction transverse to that of the side section. This provides for improved lateral support of the energy absorber and bumper and improved energy absorption of a wide range and direction of impact loads.

In U.S. Pat. No. 4,509,781 to Dick et al filed Sept. 20, 1982 for Isolated Bumper For Damping Vibrations in Vehicles and assigned to the assignee of this invention, there is disclosed a specialized elastomeric isolator for isolating the telescopic energy absorber and the bumper from that of the vehicle frame so that the energy absorber and bumper mass can be used to damp engine excited vibrations of the seat, steering column and other vehicular components. The present invention further provides for such damping with the energy absorber effectively serving as the isolator for the bumper. With this energy absorber system, there is highly effective bumper mass damping of a wide range of vibratory energy including horizontal, vertical and lateral oscillations of vehicular components.

It is a feature, object and advantage of this invention to provide a new and improved energy absorbing bumper system for vehicles which incorporates a bracket member supporting a hardbar bumper across one end of a vehicle which experiences engine excited vibration of the internal components therein and which effectively dissipates such vibration and which further provides for new and improved absorption of impact loads including improved lateral load support.

Another feature, object and advantage of this invention is to provide a new and improved multi-celled energy absorbing cellular media which incorporates a plurality of sections which can be molded with the cells oriented in the same direction and in which live hinge means interconnects one of the sections with the other to allow the turning of the sections with respect to one another for the transverse orientation of one of said sections with respect to another thereof.

Another feature, object and advantage of this invention is to provide a new and improved hardbar energy absorbing bumper system in which a multipart open-celled media is operatively housed in a spring bumper mounting bracket to effectively dissipate impact energy stroking the bumper.

These and other features, objects and advantages of this invention will become more apparent from the following detailed description and drawings in which:

FIG. 1a is an isometric view of a bumper assembly for a vehicle.

FIG. 1 is an isometric view with parts exploded of a portion of a front-wheel-drive vehicle.

FIG. 2 is an oblique projection view of the bracket and cellular energy absorber assembly of FIG. 1.

FIG. 3 is an oblique projection view showing the bracket and energy absorber assembly of FIG. 2 exploded.

Figure 4:
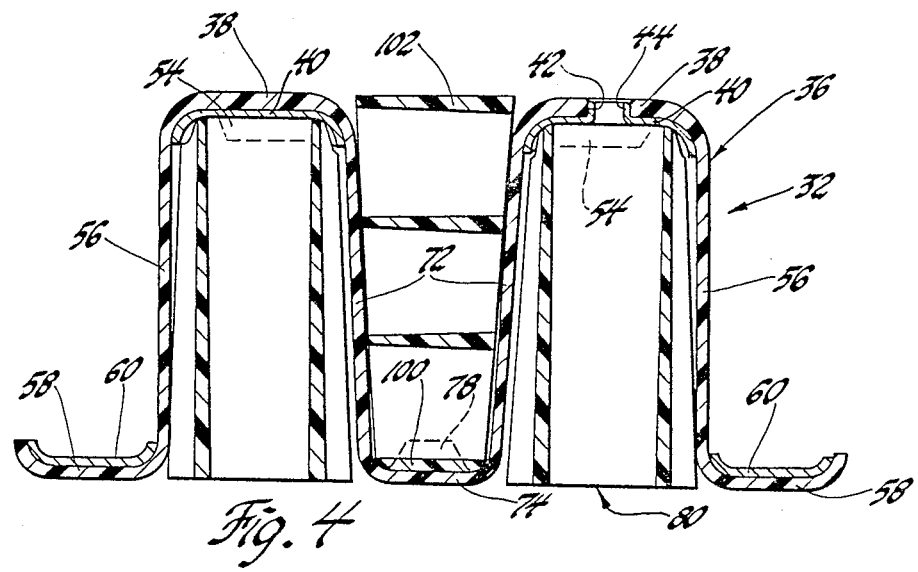
FIG. 4 is a cross-sectional view taken along lines 4—4 of FIG. 2 as viewed in the direction of the sight arrows.

FIGS. 1 and 1a show components of a forward portion of a vehicle including vehicle frame side rail 12 on which power package 14, comprising an internal combustion engine and automatic transmission, transversely supported in the vehicle by resilient elastomeric mounts 16. An output shaft 18 driven by the power package drives the front dirigible wheel assembly 20 that is pivotally supported on the side rail by control arm 22. A MacPherson strut 24, incorporating a shock absorber and helical suspension spring, is mounted to the wheel assembly 20 and provides the damped spring suspension of the vehicle body 26. The wheel assembly 20 is steered through a steering wheel 28 operatively mounted at the upper end of a steering column 30 connected to the dirigible wheel assembly by a steering shaft and conventional steering linkage not illustrated. The side rails 12 have mounted at their outer ends identical energy absorbing units 32. A laterally extending hardbar bumper assembly 34 of steel or other suitable material is in turn mounted at a predetermined height above road level to the front of the energy absorber units. The bumper supporting energy absorber units are resilient and flex to permit the stroking movement of the bumper relative to the supporting side rails on impact including front corner and side impacts. The plastic deformation of the units 32 dissipates impact energy and the elastic recovery properties of the units returns the bumper assembly to preimpact position after removal of the impact loads, preferably at a slow rate of recovery.

Each of the energy absorbing units 32 comprises a multi-pocketed resilient bracket 36 formed by a molded wall of engineering plastic such as polycarbonate which has high strength and good spring characteristics for bumper support. In the preferred embodiment, the bracket has a serpentined W-shape cross-section and provides good support of the bumper assembly to accommodate the elevating force of a jack so that the vehicle may be raised for tire change or other service work and to accommodate towing forces.

The bracket 36 is a one-piece spring that is designed to return to at least 95% of its original shape after impact and allow bumper displacement from front corner and side impacts. The two flat rear walls 38 of the bracket 36 accommodate the metallic channeled reinforcement bars 40. The walls 38 have openings 42 aligned with corresponding cylindrical collars 44 of the reinforcements and openings 46 in the end plate 48 of the side rail 12 for reception of threaded fasteners 50 utilized to secure the bracket 36 to the support plate. Upper and lower tabs 52, 54 extending forwardly from each end wall 38 cooperate therewith to form end pockets for support of the reinforcement bars. The bracket 36 has outer side legs 56 extending forwardly from the associated rear wall 38 to corresponding left and right and laterally extending flanges 58. These flanges accommodate channeled metallic reinforcement bars 60 on the inner side thereof and have vertically extending adjustment openings 62 that align with corresponding vertical adjustment openings 64 in the bars 60. These openings accommodate threaded fasteners 68 extending from the face mount of the bumper assembly 34 which receive nuts 70 to secure the bumper assembly to the bracket 36 in vertically adjusted position. In addition to the two side walls 52, 52, the bracket has, in its preferred form, two interior and laterally spaced walls 72, 72 which extend from the rear walls 38 and converging onto a central front wall 74 in lateral alignment with the flanges 58 and adjacent to the inner end wall of the bumper assembly 34. Upper and lower tabs 76, 78 cooperate with the front wall 74 to form a retainer pocket for a portion of cellular energy absorber unit 80 described below. The walls of the bracket 36 cooperate to form the generally serpentined W-shape cross-section configuration and thereby provide the three tapered pockets best shown in FIG. 4 for reception, retention and control of the resilient energy absorbing unit 80.

Figure 5:
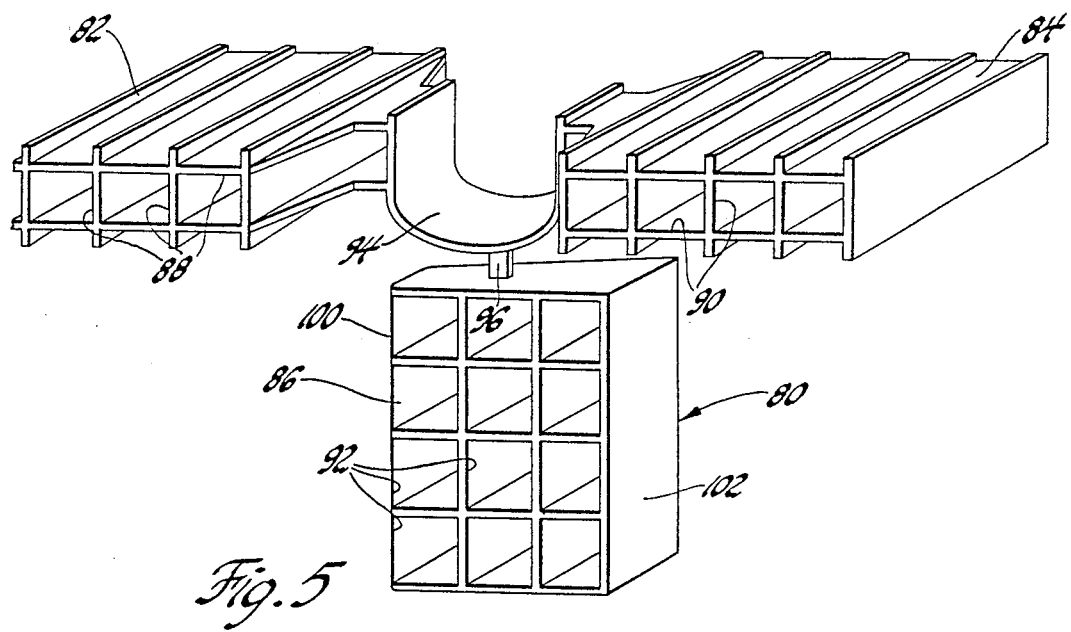
FIG. 5 is an oblique projection view of the energy absorber of this invention shown in the molded position.

In the preferred form, the energy absorbing unit 80 is an injected molded cellular matrix of olefin material having first, second and third discrete energy absorbing sections 82, 84 and 86 each with rectilinear and longitudinally extending walls respectively forming cells 88, 90 and 92. The matrix is molded as a one-piece unit in the orientation shown in FIG. 5 with the longitudinal axes of all the cells extending in the same direction. As shown, the molded sections 82, 84 are identical rectilinear sections interconnected by a curved and laterally extending live hinge 94 integral therewith. The third section 86 is wedge-shaped as shown and is connected to live hinge 94 by an integral vertical live hinge 96. In the molding position of FIG. 5, the walls of the cells taper into the mold and the cells extend in the same direction. With such construction, the interconnected cellular sections can be axially injected from the mold without difficulty.

Figure 6:
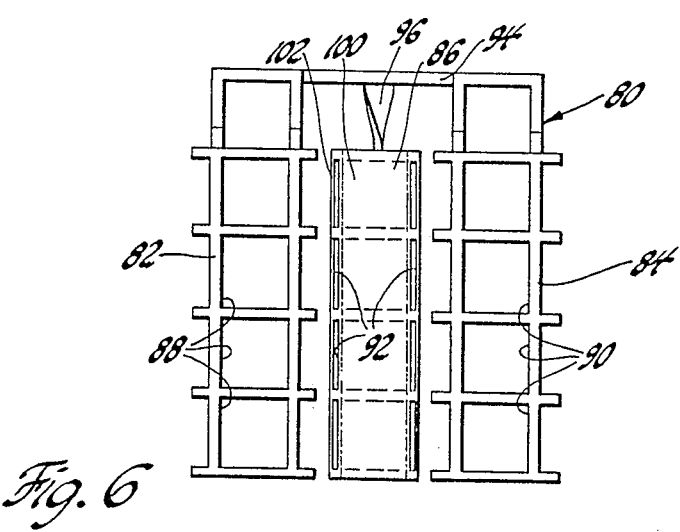
FIG. 6 is a front view showing the cellular energy absorber of this invention turned to the assembly position.

After molding, the third or central wedge-shaped section 86 of the energy absorbing unit 80 is turned 90° on the vertical axis provided by live hinge 96 from the molding position. In the turned position, these cells 92 of the third section 86 will be transverse to the axes of the cells 88 and 90 of the rectilinear first and second sections 82 and 84. After the third section 86 has been rotated, the first and second or end sections 82 and 84 are turned downwardly 90° while maintaining the horizontal orientation of the cells to the assembly position of FIG. 6. In this position, the hinge 94 forms a top wall and the cellular unit is axially installed into three pockets provided by the serpentined W-shape bracket 36. In the FIG. 6 position, the intermediate section tapers from the narrow forward wall 100 to a wide rear wall 102 to closely fit into the center pocket provided by the bracket 30.

In the installed position, FIGS. 1, 2 and 4, the cells of the central section of the energy absorber unit are transversely oriented with respect to the cells of the end sections for better alignment with some lateral or corner impact forces. The walls of these transverse cells twist and buckle to absorb impact energy as is well known in this art. This orientation further precludes side or match box collapse of the longitudinally extending cells forming the first and second sections. The longitudinally extending cells also twist and buckle to dissipate frontal loads as well as angular impacts stroking the bumper. Accordingly, this invention provides more lateral rigidity and more efficient and uniform energy absorption over the entire deflection stroke regardless of direction of impact load. Furthermore, with this invention, cell depth is reduced and this reduces material requirement, molding cycle time and makes the part easier to mold.

In addition to providing improved impact protection, this invention elastically isolates the hardbar bumper assembly with respect to the vehicle body so that it has relative motion and functions as a damping mass to damp engine excited vibrations of the steering column 30, occupants seat, not shown, or other vehicular components. To this end, the mass and frequency of the bumper assembly is selected to be out of phase with the vibrating motions of the vehicle body and frame to dampen vibrations of the steering columns and other vehicle components during engine idle conditions. By this action, the bumper effectively reduces the amplitude of the vibration of the steering column. This reduces part fatigue, noise and improves comfort for the vehicle operator and passenger. With the oriented cells of the central section of the media, horizontal components of the bumper vibration are damped and may be tailored as required for optimized performance.

Figure 7:
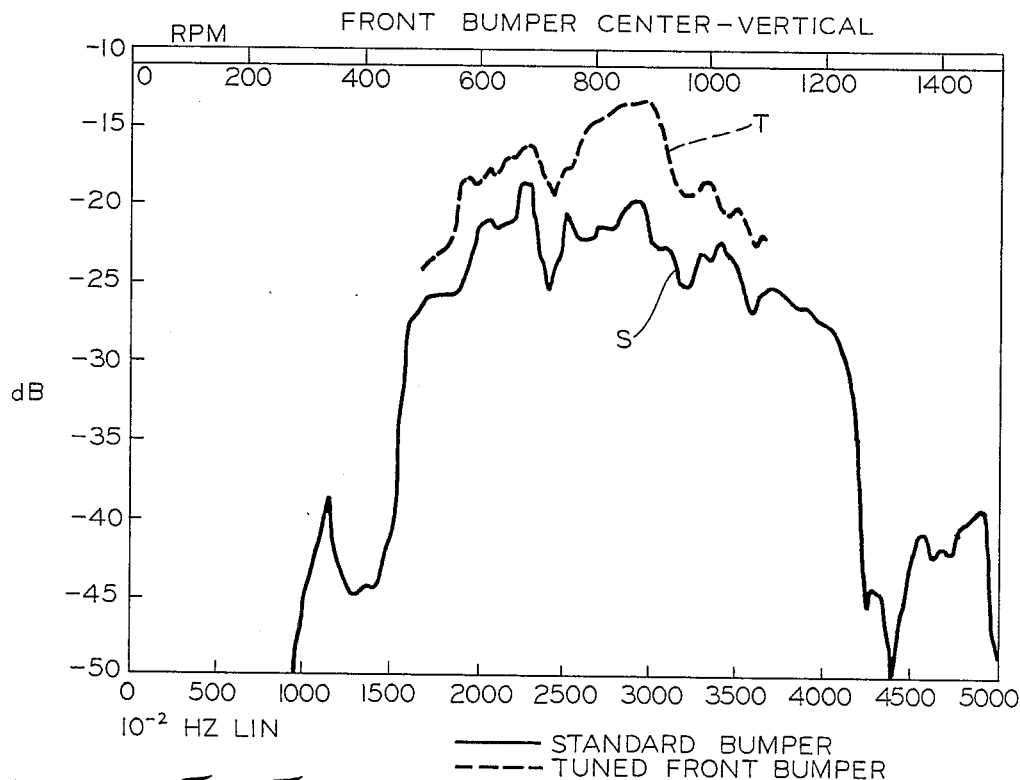
FIGS. 7 and 8 are graphs comparing operation of a standard bumper system and the tuned bumper system of this invention in damping engine excited vibrations of the steering column within the vehicle.
Figure 8:
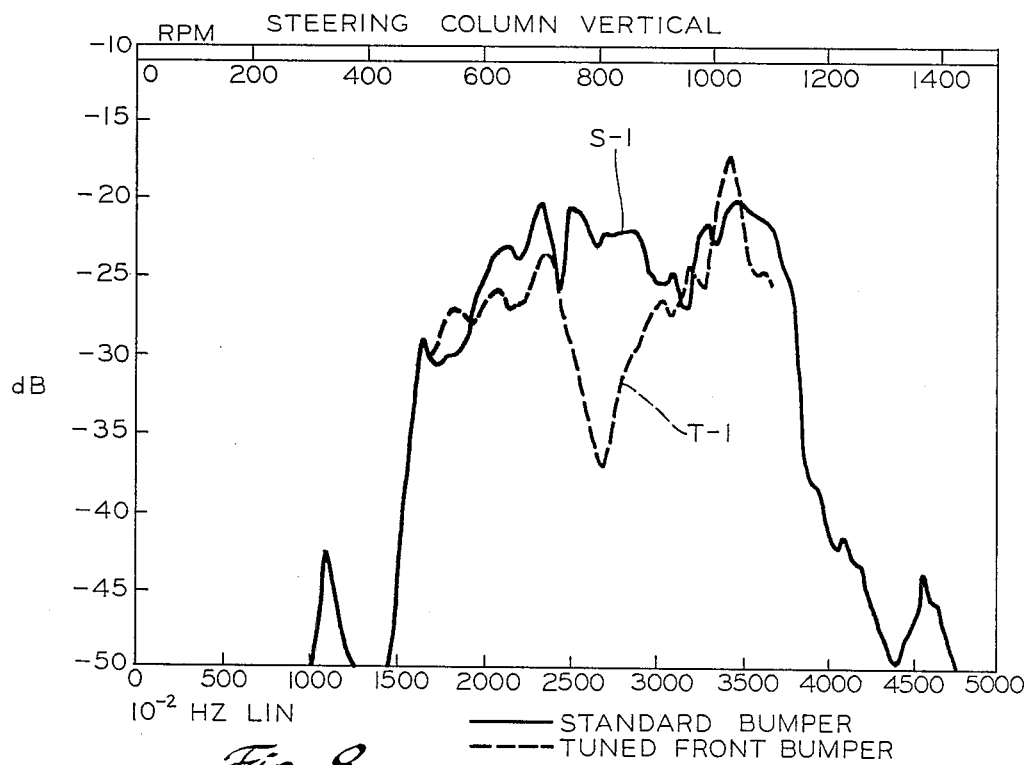

FIG. 7 illustrates action of the energy absorber isolated front bumper of this invention in damping engine excited vibration and compares this action to that of a standard bumper on the same vehicle. The engine operating in an idle speed range was swept from 17 to 37 Hz (510–1,110 rpm). The ordinate is in decibels and represents the ratio of amplitude of bumper vibration to engine oscillation. The dashed line curve T illustrates the increase of tuned bumper acceleration over that of a standard bumper, whose operation is illustrated by curve S, to dissipate engine excited vibration of internal components. The idle shake reduction of the steering column is illustrated by the curves of FIG. 8. The dashed line curve T-1 illustrates steering column vertical vibration with the tuned bumper system while curve S-1 illustrates increased steering column vibration with a standard bumper system. The idle shake reduction is shown by the area between the response curves T-1 and S-1 and is substantially to provide the desired improvement.

While a preferred embodiment of the invention has been shown and described, other embodiments will become apparent to those skilled in the art. Accordingly, the scope of this invention is set forth in the following claims.

The embodiments of the invention in which an exclusive property or privilege is claimed are defined as follows:

1. An energy absorber unit adapted to operatively connect a hardbar bumper to a vehicle comprising a resilient bumper support bracket having laterally spaced exterior side walls and a pair of interior walls spaced from one another and from said side walls, front web means connecting a forward portion of said interior walls to one another and back wall means connecting a first interior wall to one side wall and a second interior wall to the other side wall to thereby form a plurality of upwardly opening pockets, a resilient and discrete energy absorber separable from said bracket comprising a plurality of sections, each section being shaped to correspond with and to fit within a corresponding pocket therefor and each having a plurality of resilient walls which intersect one another to form a plurality of open cells, said cells of at least one of said sections having longitudinal axes oriented at a predetermined angle which intersects the longitudinal axes of the cells of another of said sections so that said energy absorber effectively dissipates frontal and corner impact energy.

2. The energy absorber unit of claim 1 wherein said energy absorber has a top wall and one of said sections is pivotally connected to said top wall to allow the limited rotation about a vertical axis and the orientation of the cells of said last recited section to be transverse with respect to the cells of the other of said sections.

3. A resilient one-piece energy absorbing grid of plastic material for use in dissipating energy in a vehicle bumper system, said grid comprising first, second and third grid sections disposed adjacent to each other, each of said grid sections having a plurality of longitudinally extending cells extending in a first axial direction and having common walls therebetween, first live hinge means interconnecting said first and second grid sections at a predetermined spacing from each other and forming a connection therebetween, a third of said grid sections being connected intermediate of said first and second sections and to said first live hinge means by second live hinge means so that said third section can be turned on a vertical axis to orient the cells of said third section in a direction generally transverse to said first axial direction and whereby the first live hinge means permits said first and second sections to be subsequently positioned to the sides of said third section.

4. The one-piece energy absorbing grid of claim 3 wherein said third section is a generally wedge-shaped member which tapers from one end thereof to the other.

5. The energy absorbing grid of claim 4 and further including a serpentined resilient support bracket of plastic material, said bracket forming a plurality of adjacent and discrete pockets for reception of the first, second and third sections and in which said third section fits in one pocket of said bracket.

* * * * *